(12) United States Patent
Ohtsuka et al.

(10) Patent No.: US 7,371,706 B2
(45) Date of Patent: May 13, 2008

(54) CATALYST FOR REMOVING HYDROCARBONS FROM EXHAUST GAS AND METHOD FOR PURIFICATION OF EXHAUST GAS

(75) Inventors: Hirofumi Ohtsuka, Ashiya (JP); Takeshi Tabata, Kyoto (JP); Takatoshi Nakahira, Sakai (JP); Masataka Masuda, Amagasaki (JP); Takenori Hirano, Izumi (JP)

(73) Assignee: Osaka Gas Company Limited, Osaka-shi (JP)

( * ) Notice: Subject to any disclaimer, the term of this patent is extended or adjusted under 35 U.S.C. 154(b) by 0 days.

(21) Appl. No.: 10/838,552

(22) Filed: May 4, 2004

(65) Prior Publication Data

US 2004/0235654 A1 Nov. 25, 2004

Related U.S. Application Data

(62) Division of application No. 09/622,469, filed as application No. PCT/JP99/01100 on Mar. 8, 1999, now Pat. No. 6,602,481.

(30) Foreign Application Priority Data

| Mar. 9, 1998 | (JP) | ................................. 10-56867 |
| Dec. 14, 1998 | (JP) | ............................... 10-354422 |
| Jan. 26, 1999 | (JP) | ................................. 11-17410 |
| Jan. 26, 1999 | (JP) | ................................. 11-17415 |

(51) Int. Cl.
*B01J 23/42* (2006.01)
*B01J 23/44* (2006.01)
*B01J 23/00* (2006.01)
*B01J 21/04* (2006.01)

(52) U.S. Cl. .................. 502/339; 502/326; 502/349; 502/439

(58) Field of Classification Search ............... 502/325, 502/326, 339, 349, 439
See application file for complete search history.

(56) References Cited

U.S. PATENT DOCUMENTS

| 2,911,357 | A | * | 11/1959 | Myers et al. ............... 208/138 |
| 3,481,787 | A | * | 12/1969 | Adlhart ....................... 429/13 |
| 3,988,423 | A | | 10/1976 | Ohrui et al. ................ 423/236 |
| 4,053,556 | A | | 10/1977 | Acres ....................... 423/239.1 |
| 4,366,668 | A | | 1/1983 | Madgavkar et al. ....... 60/39.06 |

(Continued)

FOREIGN PATENT DOCUMENTS

EP 494388 7/1992

(Continued)

OTHER PUBLICATIONS

Anderson, R.B., Stein, K.C., Feenan, J.J., and Hofer, J.E., "Catalytic Oxidation of Methane," *Industrial and Engineering Chemistry*, vol. 53 (1961), pp. 809-812.

(Continued)

*Primary Examiner*—Cam N. Nguyen
(74) *Attorney, Agent, or Firm*—Kratz, Quintos & Hanson, LLP

(57) ABSTRACT

A catalyst for removing hydrocarbons from exhaust gas containing methane and an excess of oxygen, which comprises palladium or palladium/platinum supported on at least one carrier selected from zirconia, sulfated zirconia and tungsten-zirconia, and a method for treating exhaust gas using the catalyst.

4 Claims, 3 Drawing Sheets

U.S. PATENT DOCUMENTS

| | | | |
|---|---|---|---|
| 4,572,904 A * | 2/1986 | Onal | 502/333 |
| 4,844,837 A | 7/1989 | Heck et al. | 252/373 |
| 4,884,837 A | 12/1989 | Nakazawa | 252/373 |
| 4,916,108 A * | 4/1990 | McLaughlin et al. | 502/337 |
| 5,015,617 A * | 5/1991 | Ohata et al. | 502/304 |
| 5,061,464 A * | 10/1991 | Cordonna et al. | 423/213.5 |
| 5,106,800 A | 4/1992 | Moser et al. | 502/53 |
| 5,106,802 A * | 4/1992 | Horiuchi et al. | 502/65 |
| 5,128,291 A * | 7/1992 | Wax et al. | 502/8 |
| 5,141,912 A * | 8/1992 | Ernest et al. | 502/320 |
| 5,145,825 A | 9/1992 | Deeba et al. | 502/242 |
| 5,191,139 A * | 3/1993 | Sanderson et al. | 585/520 |
| 5,217,938 A * | 6/1993 | Reinalda et al. | 502/325 |
| 5,260,043 A | 11/1993 | Li et al. | 423/239 |
| 5,275,997 A * | 1/1994 | Ganguli et al. | 502/304 |
| 5,318,757 A * | 6/1994 | Abe et al. | 422/174 |
| 5,380,691 A * | 1/1995 | Popa | 502/170 |
| 5,422,327 A * | 6/1995 | Soled et al. | 502/242 |
| 5,447,898 A * | 9/1995 | Blankenstein et al. | 502/349 |
| 5,451,558 A * | 9/1995 | Campbell et al. | 502/325 |
| 5,510,056 A | 4/1996 | Jacobs et al. | 252/373 |
| 5,658,543 A | 8/1997 | Yoshida et al. | 423/213.2 |
| 5,707,920 A * | 1/1998 | Vanderspurt et al. | 502/324 |
| 5,741,467 A * | 4/1998 | Williamson et al. | 423/213.5 |
| 5,753,192 A | 5/1998 | Dobson et al. | 422/171 |
| 5,753,580 A * | 5/1998 | Hayashi et al. | 502/304 |
| 5,756,057 A * | 5/1998 | Tsuchitani et al. | 423/213.2 |
| 5,786,294 A * | 7/1998 | Sachtler et al. | 502/349 |
| 5,830,421 A * | 11/1998 | Gardner et al. | 423/213.2 |
| 5,837,641 A | 11/1998 | Gosling et al. | 502/219 |
| 5,851,950 A * | 12/1998 | Rossin et al. | 502/349 |
| 5,856,263 A * | 1/1999 | Bhasin et al. | 502/333 |
| 5,895,636 A | 4/1999 | Nguyen et al. | 423/245.1 |
| 5,915,951 A * | 6/1999 | Euzen et al. | 431/7 |
| 5,990,344 A * | 11/1999 | Couves et al. | 560/245 |
| 5,994,257 A * | 11/1999 | Kallenbach | 502/207 |
| 6,037,303 A * | 3/2000 | Peratello et al. | 502/217 |
| 6,110,861 A * | 8/2000 | Krumpelt et al. | 502/326 |
| 6,139,814 A * | 10/2000 | Shigapov et al. | 423/592.1 |
| 6,150,299 A | 11/2000 | Umemoto et al. | 423/213.2 |
| 6,165,934 A * | 12/2000 | Gardner et al. | 502/330 |
| 6,165,935 A * | 12/2000 | Williamson et al. | 502/339 |
| 6,239,064 B1* | 5/2001 | Nguyen et al. | 502/328 |
| 6,284,210 B1* | 9/2001 | Euzen et al. | 423/213.5 |
| 6,348,430 B1* | 2/2002 | Lindner et al. | 502/304 |
| 6,497,851 B1* | 12/2002 | Hu et al. | 423/213.5 |
| 6,846,773 B1* | 1/2005 | Yokoyama et al. | 502/339 |
| 2005/0002839 A1* | 1/2005 | Ohtsuka et al. | 423/213.5 |

FOREIGN PATENT DOCUMENTS

| | | |
|---|---|---|
| EP | 0494388 | 7/1992 |
| EP | 666099 | 8/1995 |
| EP | 9639244 | 12/1996 |
| EP | 811419 | 12/1997 |
| JP | 6051543 | 3/1985 |
| JP | 60051543 | 3/1985 |
| JP | 06246159 | 9/1994 |
| JP | 8229353 | 9/1996 |
| JP | 1033985 | 2/1998 |
| WO | WO 9209849 | 6/1992 |
| WO | WO 9639244 | 12/1996 |

OTHER PUBLICATIONS

Ribeiro, F. H., Chow, M., and Dalla Betta, R. A., "Kinetics of the Complete Oxidation of Methane over Supported Palladium Catalysts," *Journal of Catalysis*, vol. 146 (1994), pp. 537-544.

Lampert, J. K., Kazi, M. S., and Farrauto, R. J., "Palladium Catalyst Performance for Methane Emissions Abatement from Lean Burn Natural Gas Vehicles," *Applied Catalysis B: Environmental*, vol. 14 (1997), pp. 211-223.

European Search Report dated Nov. 15, 2005.

* cited by examiner

CATALYST FOR REMOVING HYDROCARBONS FROM EXHAUST GAS AND METHOD FOR PURIFICATION OF EXHAUST GAS

CROSS-REFERENCE TO RELATED APPLICATIONS

This application is a divisional application of U.S. patent application Ser. No. 09/622,469 filed on Aug. 17, 2000 now U.S. Pat. No. 6,602,481, which is a national phase application of International Application No. PCT/JP99/01100, which was filed on Mar. 8, 1999 and which published in Japanese on Sep. 16, 1999, which in turn claims priority from Japanese Application JP 10/56867, which was filed on Mar. 9, 1998, from Japanese Application JP 10/345422, which was filed on Dec. 14, 1998, from Japanese Application JP 11/17410, which was filed on Jan. 26, 1999, and from Japanese Application JP 11/17415, which was filed on Jan. 26, 1998, incorporated by reference herein.

TECHNICAL FIELD

The invention relates to a catalyst for removing hydrocarbons from exhaust gas containing methane and an excess of oxygen, and a method for purification of exhaust gas.

In the specification, the "exhaust gas containing an excess of oxygen" means that the exhaust gas to be treated with the catalyst of the present invention is an exhaust gas containing oxidizing components such as oxygen and nitrogen oxides in larger amounts than necessary to completely oxidize reducing components which coexist therewith.

BACKGROUND ART

Catalysts comprising platinum group metals (e.g., platinum and palladium) supported thereon are known to have high capability to remove hydrocarbons from exhaust gas by oxidation. For example, Japanese Unexamined Patent Publication No. 106691/1976 describes a catalyst for purifying exhaust gas, the catalyst comprising palladium and platinum supported on an alumina carrier. However, even these catalysts fail to produce sufficient purifying effects on exhaust gas containing hydrocarbons which mainly consist of methane having high chemical stability, like exhaust gas resulting from natural gas combustion. Unlike ammonia, methane that is substantially non-toxic and has poor photochemical reactivity is considered not to greatly damage the regional air environment. However, it is desirable that methane emissions be suppressed as much as possible from the viewpoint of future global environmental protection.

It is also known that reaction inhibitors such as sulfur oxides usually coexist in exhaust gas and these compounds greatly reduce catalyst activity with time. Unlike petroleum fuel such as kerosene or light oil, natural gas does not originally contain substantial amounts of sulfur compounds. However, city gas derived from natural gas and supplied in our country further comprises a compound containing sulfur as an odorant, which forms a sulfur oxide during the combustion of gas, inhibiting catalytic activity of platinum group catalysts.

For example, Lampert reports that when methane is oxidized with a palladium catalyst in the presence of only 0.1 ppm of sulfur dioxide in the methane, the catalyst activity is almost totally lost in several hours (Applied Catalysis B: Environmental, vol.14, pp.211-223 (1997)).

Yamamoto et al. report that when hydrocarbons are removed from combusted city gas using a catalyst comprising palladium and platinum both supported on alumina, catalyst activity sharply declines in a short time of about 100 hours (Catalysis Society of Japan Meeting Abstract, 1996, published on Sep. 13, 1996).

Further, Japanese Unexamined Patent Publication No. 332392/1996 describes an oxidation catalyst for removing low-concentration hydrocarbons from exhaust gas in the presence of an excess of oxygen, the catalyst comprising at least 7 g/l of palladium and 3 to 20 g/l of platinum both supported via an alumina carrier on a honeycomb substrate. However, since this catalyst does not have sufficient long-term durability, time-dependent degradation of catalytic activity is unavoidable.

As described above, the conventional exhaust gas treatment methods have the problems that methane removal efficiency is low and that catalyst activity sharply declines in a short time in the presence of sulfur oxides.

Exhaust gas usually contains nitrogen oxides in addition to hydrocarbons. Known methods for removing nitrogen oxides and hydrocarbons from exhaust gas include, for example, a method for removing nitrogen oxides using hydrocarbon as a reducing agent (e.g., Japanese Unexamined Patent Publication No. 310742/1989).

Further, Japanese Unexamined Patent Publication No. 90826/1992 describes a method for purifying exhaust gas, comprising bringing exhaust gas containing nitrogen oxides into contact with a specific catalyst in the presence of hydrocarbon in an oxidation atmosphere containing an excess of oxygen so as to decompose nitrogen oxides and bringing the exhaust gas into contact with an oxidation catalyst so as to suppress hydrocarbon emissions.

According to the methods described in the above publications, propane, propene or the like converts to carbon dioxide at a high rate under conditions suitable for the removal of nitrogen oxides, so that only a low percentage thereof remains in the treated gas. However, a large amount of methane unavoidably resides in the treated gas because of its low reactivity under the conditions where known catalysts for removal of nitrogen oxides exhibit high activity. Therefore, in the case of treating exhaust gas containing methane, improvement is necessary in this point.

Japanese Unexamined Patent Publication No. 90826/1992 describes removing unreacted hydrocarbons by passing exhaust gas through a nitrogen oxide-removing catalyst and thereafter through an oxidation catalyst, and mentions, as oxidation catalysts, catalysts comprising 0.01 to 2% of platinum, rhodium, palladium or the like supported on porous carriers. The publication, however, nowhere describes reactivity of these catalysts to methane. In view of the above-mentioned report of Lampert et al., it is hardly conceivable that such a catalyst is capable of removing methane from exhaust gas.

U.S. Pat. No. 5,260,043 describes a method for removing nitrogen oxides and methane from a gas containing methane, nitrogen oxides and oxygen, the method comprising using a Co-ZSM-5 catalyst in the first stage and using a Pd-ZSM-5 catalyst in the second stage. However, practicability of this method is extremely questionable because neither steam nor sulfur oxides are contained in the gas tested according to the method described in the publication. Furthermore, in consideration of descriptions about effects of steam on methane-oxidation activity of Pd-ZSM-5 catalysts provided in another publication (Yuejin Li and John N. Armor, Applied Catalysis B: Environmental, vol.3, pp.275 (1994)), it is unlikely that methane will be removed from actual exhaust gas containing steam, by the method disclosed in the patent.

The above is summarized as follows. It is difficult to remove methane from actual exhaust gas by oxidation using any prior art technique, by treating the gas within a temperature range where nitrogen oxide-removing catalysts act effectively. It is difficult to achieve a high hydrocarbon conversion rate in the case of treating exhaust gas containing hydrocarbons containing a large amount of methane, for example, exhaust gas resulting from natural gas combustion. Consequently, if natural gas is added to exhaust gas to reduce nitrogen oxides, methane emissions will increase.

Other sources of methane-containing exhaust gas include organism-derived, methane-containing exhaust gas generated by fermentation of garbage, domestic animal wastes and like biological wastes. Such exhaust gas, however, usually contains sulfur-containing organic compounds derived from protein, etc. Therefore, during the removal of hydrocarbons by oxidation with a catalyst, the sulfur-containing organic compounds are oxidized to sulfur oxides, which reduce catalyst activity in a similar manner as described above.

OBJECT OF THE INVENTION

A primary object of the present invention is to provide a catalyst for removing hydrocarbons from exhaust gas containing methane and an excess of oxygen, the catalyst being capable of producing highly purifying effects even on exhaust gas containing hydrocarbons containing a large proportion of methane and exhibiting stable long-term catalytic activity even in the presence of sulfur oxides, and to provide a method for purification of exhaust gas using the catalyst.

DISCLOSURE OF INVENTION

The present inventors carried out intensive research to achieve the above object and found the following. A catalyst comprising palladium supported on at least one carrier selected from zirconia, sulfated zirconia ($SO_4/ZrO_2$) and tungsten-zirconia ($WO_3/ZrO_2$) is highly resistant to inhibition of catalyst activity by sulfur oxides and maintains its stably high capability to oxidize methane even in an exhaust gas environment.

The present inventors further found that a catalyst comprising palladium and platinum both supported on at least one carrier selected from zirconia, sulfated zirconia ($SO_4/ZrO_2$) and tungsten-zirconia ($WO_3/ZrO_2$) is highly capable of oxidizing methane even at lower treatment temperatures.

The present invention has been accomplished based on the above findings. The present invention concerns the following catalysts for purification of hydrocarbon-containing exhaust gas and methods for purification of hydrocarbon-containing exhaust gas.

1. A catalyst for removing hydrocarbons from exhaust gas containing methane and an excess of oxygen, which comprises palladium supported on at least one carrier selected from zirconia, sulfated zirconia and tungsten-zirconia.

2. The catalyst according to item 1 wherein the weight proportion of supported palladium is 2% to 20% relative to the carrier.

3. A catalyst for removing hydrocarbons from exhaust gas containing methane and an excess of oxygen, which comprises palladium and platinum both supported on at least one carrier selected from zirconia, sulfated zirconia and tungsten-zirconia.

4. The catalyst according to item 3 wherein the weight proportion of supported palladium is 2% to 20% relative to the carrier and the weight proportion of supported platinum is 10% to 50% relative to the palladium.

5. A method for removing hydrocarbons from exhaust gas containing methane and an excess of oxygen, using a catalyst comprising palladium supported on at least one carrier selected from zirconia, sulfated zirconia and tungsten-zirconia.

6. The method according to item 5 wherein the weight proportion of supported palladium is 2% to 20% relative to the carrier.

7. A method for removing hydrocarbons from exhaust gas containing methane and an excess of oxygen, using a catalyst comprising palladium and platinum both supported on at least one carrier selected from zirconia, sulfated zirconia and tungsten-zirconia.

8. The method for removing hydrocarbons from exhaust gas according to item 7 wherein the weight proportion of supported palladium is 2% to 20% relative to the carrier and the weight proportion of supported platinum is 10% to 50% relative to the palladium.

9. A method for purifying exhaust gas containing nitrogen oxides and hydrocarbons including methane, the method comprising bringing the exhaust gas into contact with a nitrogen oxide reduction catalyst in the presence of hydrocarbons and thereafter bringing the exhaust gas into contact with a catalyst comprising palladium supported on at least one carrier selected from zirconia, sulfated zirconia and tungsten-zirconia.

10. The method for purifying exhaust gas according to item 9 wherein the weight proportion of supported palladium is 2% to 20% relative to the carrier.

11. A method for purifying exhaust gas containing nitrogen oxides and hydrocarbons including methane, the method comprising bringing the exhaust gas into contact with a nitrogen oxide reduction catalyst in the presence of hydrocarbons and thereafter bringing the exhaust gas into contact with a catalyst comprising palladium and platinum both supported on at least one carrier selected from zirconia, sulfated zirconia and tungsten-zirconia.

12. The method for purifying exhaust gas according to item 11 wherein the weight proportion of supported palladium is 2% to 20% relative to the carrier and the weight proportion of supported platinum is 10% to 50% relative to the palladium.

13. The method for purifying exhaust gas according to any one of items 9-12, which comprises adding natural gas to exhaust gas before bringing the exhaust gas into contact with a nitrogen oxide reduction catalyst.

The catalyst according to the present invention is prepared by having a commercially available zirconia carrier impregnated with a solution containing palladium ion or palladium ion and platinum ion, followed by drying and calcining. The specific surface area of the zirconia carrier is an important factor for achieving stably high dispersion of palladium or palladium/platinum. It is preferable for the specific surface area to be at least 5 $m^2/g$, more preferably in the range of 5 to 50 $m^2/g$. Useful carriers include sulfated zirconia ($SO_4/ZrO_2$) and tungsten-zirconia ($WO_3/ZrO_2$). Zirconia, sulfated zirconia and tungsten-zirconia may be used singly or in combination of two or more.

Sulfated zirconia and tungsten-zirconia can be prepared by known methods (for example, see "Hyomen(Surface)", vol.28, No.7, page 481 (1990); "Hyomen(Surface)", vol.34, No.2, page 51 (1996)). Stated more specifically, sulfated zirconia can be prepared by treating zirconium hydroxide with diluted sulfuric acid or causing zirconium hydroxide to be impregnated with ammonium sulfate, followed by drying and calcining. Tungsten-zirconia can be prepared by kneading zirconium hydroxide and tungstic acid in a wet state, followed by drying and calcining.

Hereinafter, "zirconia carrier" represents all the above three carriers, unless it is especially necessary to mention full names of the particular carriers.

Useful catalytic metal ion-containing solutions include solutions of metal nitrates or ammine complexes of such metals. It is preferable that such solutions be in the form of aqueous solutions but may be solutions of mixed solvents prepared by adding a water-soluble organic solvent such as acetone or ethanol.

The weight proportion of supported palladium is about 1% to about 25%, preferably about 2% to about 20%, relative to the zirconia carrier. If the proportion of supported palladium is too small, low catalytic activity will result. If the proportion of supported palladium is too large, palladium will have a larger particle diameter and will not be used effectively.

In the case of using both palladium and platinum, the weight proportion of supported palladium is the same as described above and the weight proportion of supported platinum is usually about 5% to about 50%, preferably about 10% to about 50%, relative to the palladium. If the proportion of supported platinum is too small, sufficient improvement in effects by combined use will not be achieved. If the proportion of supported platinum is too large, the function of palladium may be suppressed.

Then, the zirconia carrier impregnated with a predetermined amount of the catalytically active component is dried, followed by calcining in air, giving a desired catalyst. To provide stable long-term high catalytic activity, calcination is carried out preferably in the temperature range of about 450° C. to about 700° C., more preferably about 500° C. to about 650° C. If the calcination temperature is too high, the specific surface area of the carrier will diminish with the growth of particles of the supported metal, resulting in lower catalytic activity. If the calcination temperature is too low, particles of palladium or palladium and platinum grow during the use of the catalyst, resulting in lower catalytic activity and impairing stability.

The catalyst of the present invention may be used in any form, without limitation. For example, the catalyst may contain a binder and is formed into pellets, or the catalyst may be washcoated on a fire-resistant honeycomb substrate. It is preferable that the catalyst according to the present invention be used as a washcoat on a fire-resistant honeycomb substrate. In the case of washcoating on a fire-resistant honeycomb substrate, the catalyst prepared by the above method may be slurryed and washcoated, or zirconia particles as a carrier may be washcoated on a fire-resistant honeycomb substrate and then have palladium or palladium/platinum supported on the carrier in the same manner as above.

The method for removing hydrocarbons from methane-containing exhaust gas according to the present invention utilizes the catalyst thus obtained. If too small an amount of the catalyst is used for removing hydrocarbons, the desired removal efficiency will not be attained. It is therefore preferable that the catalyst be used in an amount such that the exhaust gas hourly space velocity (GHSV) is 500,000 hr$^{-1}$ or less, more preferably 300,000 hr$^{-1}$ or less. The lower the gas hourly space velocity (GHSV) is, the higher the proportion of the catalyst is, thus increasing removal efficiency and being advantageous. However, using the catalyst at an exhaust gas hourly space velocity (GHSV) of 1,000 hr$^{-1}$ or less is economically disadvantageous and also increases pressure loss in the catalyst bed. Therefore, the amount of the catalyst may be appropriately selected from the range that GHSV becomes 500,000 hr$^{-1}$ or less.

The hydrocarbon-removing catalyst used in the methane-containing exhaust gas according to the present invention is highly active. However, if the purification treatment temperature is too low, the catalyst does not exhibit sufficient catalytic activity, resulting in difficulty in achieving the desired hydrocarbon conversion rate. If the concentration of hydrocarbons in exhaust gas is extremely high, a rapid reaction occurs in the catalyst bed, incurring the danger of adversely affecting durability of the catalyst. In view of these matters, it is preferable that exhaust gas be subjected to purification treatment under reaction conditions such that the temperature of the catalytic layer is maintained in the range of about 350° C. to about 600° C. and temperature rise (i.e., difference between the catalytic layer outlet temperature and the catalytic layer inlet temperature) is not more than 150° C.

In another embodiment of the present invention, a catalyst for reducing nitrogen oxides in the presence of hydrocarbons (hereinafter sometimes simply referred to as "nitrogen oxide-removing catalysts") is disposed upstream of a hydrocarbon-removing catalyst, so that both of nitrogen oxides and hydrocarbons can be removed. Useful nitrogen oxide-removing catalysts are not limited and any known one may be used only if it is capable of removing nitrogen oxides by reduction using a saturated lower hydrocarbon as a reducing agent. Examples of useful catalysts include transition metal ion-exchanged zeolite catalysts (e.g., a catalyst comprising cobalt supported on a beta zeolite carrier) and a catalyst comprising silver supported on an alumina carrier.

The amount of the nitrogen oxide-removing catalyst may be selected according to the type of catalyst so as to achieve an appropriate gas space velocity. For example, a catalyst comprising cobalt supported on a beta zeolite carrier is preferably used at a gas hourly space velocity (GHSV) of not 60,000 hr$^{-1}$ or less, more preferably 30,000 hr$^{-1}$ or less. As regards use temperature, for example, a catalyst comprising cobalt supported on a beta zeolite carrier may be used at a temperature ranging from about 300° C. to about 600° C., preferably about 350° C. to about 500° C. In usual use conditions, it is impossible to set different use temperatures for a nitrogen oxide-removing catalyst and for a hydrocarbon removing catalyst. Therefore, both catalysts are preferably used in the temperature range that is within a use temperature range suitable for the hydrocarbon-removing catalyst and also within a use temperature range suitable for the nitrogen oxide-removing catalyst.

Nitrogen oxide removal efficiency can be further enhanced by adding natural gas to exhaust gas before bringing the exhaust gas into contact with the nitrogen oxide-removing catalyst in the presence of hydrocarbons. In this case, also, the method of the present invention achieves enhanced nitrogen oxide removal efficiency, while suppressing methane emissions. In other words, the method of the present invention reduces the level of nitrogen oxides and also suppresses methane emissions by providing a nitrogen oxide-removing catalyst upstream of a hydrocarbon-removing catalyst.

Exhaust gas usually contains about 5% to about 15% of steam which inhibits oxidation reaction of methane. The method according to the present invention has high methane conversion effects even on such steam-containing exhaust gas.

Further, exhaust gas usually contains sulfur oxides that are known to greatly reduce catalyst activity. The catalyst according to the present invention is highly resistant to loss of catalytic activity caused by sulfur poisoning, so that stable long-term high hydrocarbon removal efficiency can be achieved.

EFFECTS OF THE INVENTION

The catalyst according to the present invention exhibits high methane oxidation activity even in the treatment of exhaust gas containing a large amount of steam, for example, combustion gas, and is highly resistant to catalyst activity inhibition by sulfur oxides. Therefore, the catalyst of the present invention produces stable long-term highly purifying effects even on exhaust gas containing hydrocarbons containing a large amount of methane, whose purification treatment with conventional catalysts has been difficult.

Furthermore, removal of nitrogen oxides and reduction of the level of hydrocarbons are achieved at the same time by disposing a catalyst for removing nitrogen oxides in the presence of hydrocarbons (a nitrogen oxide-removing catalyst) on the upstream side and disposing a catalyst for removing hydrocarbons according to the present invention on the downstream side and passing exhaust gas over the catalysts. With this construction, the method of the present invention is highly effective for purifying exhaust gas containing hydrocarbons containing a large amount of methane, for example, exhaust gas from natural gas combustion. Therefore, methane emissions can be suppressed even when natural gas is added as a nitrogen oxide-reducing agent to the exhaust gas in order to remove nitrogen oxides.

BEST MODE FOR CARRYING OUT THE INVENTION

Figure 1:
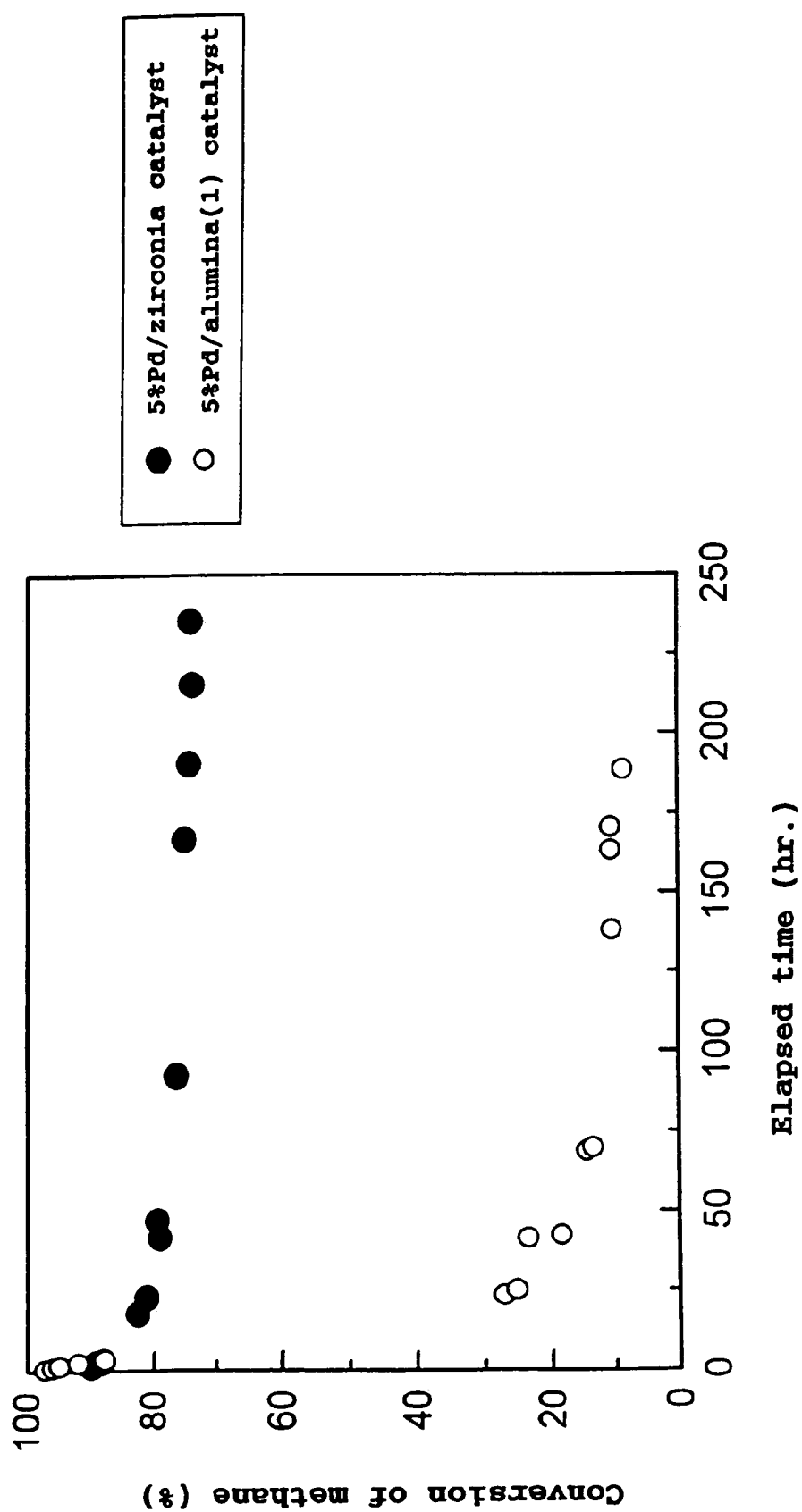
FIG. 1 is a graph showing time-dependent changes in conversion (%) of methane in exhaust gas, achieved by treating the exhaust gas with a catalyst of the present invention or with a control catalyst.

The present invention will be described below in more detail with reference to examples. These examples are not intended to limit the scope of the present invention.

EXAMPLE 1

Preparation of 2% Pd/Zirconia Catalyst

A 5 g-quantity of zirconia ("TZ-O" manufactured by Tosoh Corporation; specific surface area: 14 $m^2/g$) was immersed in 20 ml of palladium nitrate aqueous solution containing 0.10 g of palladium at 0° C. for 15 hours and dried, followed by calcining in air at 550° C. for 2 hours, giving a 2% Pd/zirconia catalyst.

EXAMPLE 2

Preparation of 5% Pd/Zirconia Catalyst

A 5 g quantity of the same zirconia as used in Example 1 was immersed in 20 ml of palladium nitrate aqueous solution containing 0.25 g of palladium at 0° C. for 15 hours and dried, followed by calcining in air at 550° C. for 2 hours, giving a 5% Pd/zirconia catalyst.

EXAMPLE 3

Preparation of 10% Pd/Zirconia Catalyst

A 5 g quantity of the same zirconia as used in Example 1 was immersed in 20 ml of palladium nitrate aqueous solution containing 0.50 g of palladium at 0° C. for 15 hours and dried, followed by calcining in air at 550° C. for 2 hours, giving a 10% Pd/zirconia catalyst.

EXAMPLE 4

Preparation of 20% Pd/Zirconia Catalyst

A 5 g quantity of the same zirconia as used in Example 1 was immersed in 20 ml of palladium nitrate aqueous solution containing 1.0 g of palladium at 0° C. for 15 hours and dried, followed by calcining in air at 550° C. for 2 hours, giving a 20% Pd/zirconia catalyst.

EXAMPLE 5

Preparation of 5% Pd-1% Pt/Zirconia Catalyst

A 5 g quantity of the same zirconia as used in Example 1 was immersed in 20 ml of a solution at 0° C. for 15 hours, the solution being prepared by mixing a palladium nitrate aqueous solution containing 0.25 g of palladium with a solution formed by dissolving 0.083 g of dinitrodiammine platinum in 1 ml of 69% nitric acid with heating, followed by addition of pure water to make a total of 20 ml. The zirconia was then dried, followed by calcining in air at 550° C. for 2 hours, giving a 5% Pd-1% Pt/zirconia catalyst.

EXAMPLE 6

Preparation of 5% Pd-0.5% Pt/Zirconia Catalyst

A 5 g quantity of the same zirconia as used in Example 1 was immersed in 20 ml of a solution at 0° C. for 15 hours, the solution being prepared by mixing a palladium nitrate aqueous solution containing 0.25 g of palladium with a solution formed by dissolving 0.042 g of dinitrodiammine platinum in 1 ml of 69% nitric acid with heating, followed by addition of pure water to make a total of 20 ml. The zirconia was then dried, followed by calcining in air at 550° C. for 2 hours, giving a 5% Pd-0.5% Pt/zirconia catalyst.

EXAMPLE 7

Preparation of 2% Pd-0.25% Pt/Zirconia Catalyst

A 5 g quantity of the same zirconia as used in Example 1 was immersed in 20 ml of a solution at 0° C. for 15 hours, the solution being prepared by mixing a palladium nitrate aqueous solution containing 0.10 g of palladium with a solution formed by dissolving 0.021 g of dinitrodiammine platinum in 1 ml of 69% nitric acid with heating, followed by addition of pure water to make a total of 20 ml. The zirconia was then dried, followed by calcining in air at 550° C. for 2 hours, giving a 2% Pd-0.25% Pt/zirconia catalyst.

EXAMPLE 8

Preparation of 2% Pd-0.5% Pt/Zirconia Catalyst

A 5 g quantity of the same zirconia as used in Example 1 was immersed in 20 ml of a solution at 0° C. for 15 hours, the solution being prepared by mixing a palladium nitrate aqueous solution containing 0.10 g of palladium with a solution formed by dissolving 0.042 g of dinitrodiammine platinum in 1 ml of 69% nitric acid with heating, followed by addition of pure water to make a total of 20 ml. The zirconia was then dried, followed by calcining in air at 550° C. for 2 hours, giving a 2% Pd-0.5% Pt/zirconia catalyst.

EXAMPLE 9

Preparation of 2% Pd-1% Pt/Zirconia Catalyst

A 5 g quantity of the same zirconia as used in Example 1 was immersed in 20 ml of a solution at 0° C. for 15 hours, the solution being prepared by mixing a palladium nitrate aqueous solution containing 0.10 g of palladium with a solution formed by dissolving 0.083 g of dinitrodiammine platinum in 1 ml of 69% nitric acid with heating, followed by addition of pure water to make a total of 20 ml. The zirconia was then dried, followed by calcining in air at 550° C. for 2 hours, giving a 2% Pd-1% Pt/zirconia catalyst.

COMPARATIVE EXAMPLE 1

Preparation of 5% Pd/Alumina Catalyst (1)

Alumina ("NK-124" manufactured by Sumitomo Chemical Industries Ltd.) was calcined in air at 800° C. for 2 hours. A 5 g quantity of the resulting alumina was immersed in 20 ml of palladium nitrate aqueous solution containing 0.25 g of palladium at 0° C. for 15 hours and dried, followed by further calcining in air at 550° C. for 2 hours, giving a 5% Pd/alumina catalyst (1).

COMPARATIVE EXAMPLE 2

Preparation of 5% Pd/Alumina Catalyst (2)

A 5 g quantity of alumina ("NK-124" manufactured by Sumitomo Chemical Industries Ltd.) was immersed in 20 ml of palladium nitrate aqueous solution containing 0.25 g of palladium at 0° C. for 15 hours and dried, followed by calcining in air at 550° C. for 2 hours, giving a 5% Pd/alumina catalyst (2).

COMPARATIVE EXAMPLE 3

Preparation of 5% Pd-1% Pt/Alumina Catalyst

Alumina ("NK-124" manufactured by Sumitomo Chemical Industries Ltd.) was calcined in air at 800° C. for 2 hours. A 5 g quantity of the resulting alumina was immersed in 20 ml of a solution at 0° C. for 15 hours, the solution being prepared by mixing a palladium nitrate aqueous solution containing 0.25 g of palladium with a solution formed by dissolving 0.085 g of dinitrodiammine platinum in 2 ml of nitric acid, followed by dilution to make a total of 20 ml. The alumina was then dried, followed by further calcining in air at 550° C. for 2 hours, giving a 5% Pd-1% Pt/alumina catalyst.

COMPARATIVE EXAMPLE 4

Preparation of 5% Pd/Silica Catalyst

Silica ("G-6" manufactured by Fuji Silysia Chemical Ltd.) was calcined in air at 800° C. for 2 hours. A 5 g quantity of the resulting silica was immersed in 20 ml of palladium nitrate aqueous solution containing 0.25 g of palladium at 0° C. for 15 hours and dried, followed by further calcining in air at 550° C. for 2 hours, giving a 5% Pd/silica catalyst.

COMPARATIVE EXAMPLE 5

Preparation of 5% Pd/Titania Catalyst

Titania ("ST-21" manufactured by Ishihara Sangyo Kaisha, Ltd.) was calcined in air at 800° C. for 2 hours. A 5 g quantity of the resulting titania was immersed in 20 ml of palladium nitrate aqueous solution containing 0.25 g of palladium at 0° C. for 15 hours and dried, followed by further calcining in air at 550° C. for 2 hours, giving a 5% Pd/titania catalyst.

EXAMPLE 10

Durability Evaluation Test 1

The catalysts obtained in Examples 1-9 and Comparative Examples 1-5 were formed into pellets, crushed and sieved to 1-2 mm grains. Using 1 ml each of the resulting grains as catalyst beds and maintaining the catalyst bed temperatures at about 500° C., a gas consisting of 1000 ppm of methane, 10% of oxygen, 6% of carbon dioxide, 10% of steam, 8 ppm of sulfur dioxide and the residual part of helium was passed over the catalyst beds at a gas hourly space velocity (GHSV) of 40,000 h$^{-1}$ to determine time-dependent changes in methane conversion (%) (catalyst durability). The gas compositions before and after passing over the catalyst reaction beds were measured with a gas chromatograph having a hydrogen flame ionization detector. Methane conversion (%) before addition of 8 ppm of sulfur dioxide to the reaction gas was also measured beforehand.

Table 1 shows methane conversion (%) achieved 3, 10, 18, 19 and 22 hours after the start of passing sulfur dioxide-containing gas. Methane conversion (%) was calculated according to the following equation:

CH$_4$ conversion (%)=100×(1−the amount of CH$_4$ at the catalyst bed outlet/the amount of CH$_4$ at the catalyst bed inlet)

TABLE 1

| | | Elapsed time from the start of passing sulfur dioxide-containing gas (hr.) | | | | | |
|---|---|---|---|---|---|---|---|
| | Catalyst composition | Before passing gas | 3 hours later | 10 hours later | 18 hours later | 19 hours later | 22 hours later |
| Example 1 | 2% Pd/zirconia | 99.6 | 98.7 | 92.2 | — | 92.1 | — |
| Example 2 | 5% Pd/zirconia | 99.7 | 99.7 | 99.3 | — | — | 99.4 |

TABLE 1-continued

|  | Catalyst composition | Elapsed time from the start of passing sulfur dioxide-containing gas (hr.) | | | | | |
|---|---|---|---|---|---|---|---|
|  |  | Before passing gas | 3 hours later | 10 hours later | 18 hours later | 19 hours later | 22 hours later |
| Example 3 | 10% Pd/zirconia | 99.7 | 99.8 | 99.5 | — | 99.6 | — |
| Example 4 | 20% Pd/zirconia | 99.7 | 99.7 | 99.0 | — | — | 99.0 |
| Example 5 | 5% Pd—1% Pt/zirconia | 99.9 | 99.6 | 99.4 | 99.6 | 99.5 | — |
| Example 6 | 5% Pd—0.5% Pt/zirconia | 99.7 | 99.7 | 99.3 | — | 99.3 | — |
| Example 7 | 2% Pd—0.25% Pt/zirconia | 99.0 | 98.8 | 96.8 | — | — | 97.4 |
| Example 8 | 2% Pd—0.5% Pt/zirconia | 99.5 | 99.4 | 98.3 | — | 97.9 | 98.5 |
| Example 9 | 2% Pd—1% Pt/zirconia | 99.8 | 99.7 | 98.7 | — | — | 98.4 |
| Comp. Ex. 1 | 5% Pd/alumina (1) | 99.6 | 98.5 | 85.5 | — | — | 66.9 |
| Comp. Ex. 2 | 5% Pd/alumina (2) | 96.8 | 95.5 | 84.1 | — | — | 71.4 |
| Comp. Ex. 3 | 5% Pd—1% Pt/alumina | 92.1 | 92.9 | 82.8 | — | — | 73.9 |
| Comp. Ex. 4 | 5% Pd/silica | 93.1 | 70.0 | 54.7 | — | — | 46.4 |
| Comp. Ex. 5 | 5% Pd/titania | 97.9 | 96.8 | 79.5 | — | — | 67.4 |

—: Not measured.

The results presented in Table 1 clearly demonstrate that the catalysts of the present inventions exhibit stable catalytic activity (methane conversion %) even in the presence of sulfur dioxide which is known to greatly inhibit catalyst activity.

EXAMPLE 11

Durability Evaluation Test 2

The catalysts obtained in Examples 2, 6 and 9 and Comparative Examples 1 and 4 were formed into pellets, crushed and sieved to 1-2 mm grains. Using 0.75 ml each of the resulting grains as catalyst beds and maintaining the catalyst bed temperatures at about 450° C., a gas consisting of 1000 ppm of methane, 10% of oxygen, 6% of carbon dioxide, 10% of steam, 8 ppm of sulfur dioxide and the residual part of helium was passed over the catalyst beds at a gas hourly space velocity (GHSV) of 40,000 h$^{-1}$ for 2 hours and then at a GHSV of 80,000 h$^{-1}$ to evaluate durability of the catalysts (catalyst durability test). The gas compositions before and after passing over the catalyst reaction beds were measured with a gas chromatograph having a hydrogen flame ionization detector. Table 2 shows changes in methane conversion (%) with time.

TABLE 2

| Elapsed time (hr.) | 5% Pd/ alumina (1) | 5% Pd/ silica | 5% Pd/ zirconia | 5% Pd—0.5% Pt/zirconia | 2% Pd—1% Pt/zirconia |
|---|---|---|---|---|---|
| 1* | 96.4 | 83.6 | 90.0 | 97.2 | 93.6 |
| 2* | 94.1 | 64.6 | 86.9 | 95.3 | 92.9 |
| 3 | 80.1 | 27.8 | 70.2 | 86.6 | 79.1 |
| 4 | 66.7 | 11.3 | 65.2 | 83.4 | 76.9 |
| 6 | 51.0 | 10.0 | 61.4 | 77.1 | 74.4 |
| 8 | 39.2 | 6.7 | 60.8 | 78.9 | 74.1 |
| 10 | 29.7 | 5.8 | 61.1 | 77.2 | 69.9 |
| 12 | 24.2 | 5.4 | 60.9 | 75.5 | 69.0 |
| 14 | 19.3 | 5.7 | 60.4 | 75.0 | — |
| 16 | 15.1 | — | 60.3 | 75.1 | — |
| 18 | — | — | — | — | 69.6 |
| 20 | — | 3.0 | — | — | 70.6 |
| 22 | 10.6 | — | — | 74.5 | 70.9 |
| 24 | 10.1 | — | 60.5 | 74.5 | 71.0 |
| 25 | — | — | 58.7 | 76.3 | 70.8 |
| 30 | — | — | 58.2 | 77.8 | 68.6 |
| 35 | — | — | 57.7 | 76.0 | 69.7 |
| 40 | — | — | 58.3 | 76.3 | — |
| 45 | — | — | — | 76.5 | 69.3 |

*The values 1 or 2 hours later were obtained by passing gas at a gas hourly space velocity (GHSV) of 40,000 h$^{-1}$.
—: Not measured.

The results presented in Table 2 also clearly demonstrate that the catalysts of the present inventions exhibit stable catalytic activity (methane conversion %) even in the presence of sulfur dioxide which is known to greatly inhibit catalyst activity.

EXAMPLE 12

Durability Evaluation Test 3

The catalysts obtained in Example 2 and Comparative Example 1 were formed into pellets, crushed and sieved to 1-2 mm grains. Using 1.5 ml each of the resulting grains as catalyst beds and maintaining the catalyst bed temperatures at about 450° C., a gas consisting of 2000 ppm of methane, 1000 ppm of carbon monoxide, 10% of oxygen, 6% of carbon dioxide, 10% of steam, 0.3 ppm of sulfur dioxide and the residual part of nitrogen was passed over the catalyst beds at a gas hourly space velocity (GHSV) of 80,000 h$^{-1}$ to evaluate durability of the catalysts. The gas compositions before and after passing over the catalyst reaction beds were measured with a gas chromatograph having a hydrogen flame ionization detector. FIG. 1 shows changes in methane conversion (%) with time.

As is clear from FIG. 1, immediately after the start of the test, methane conversion activity of the catalyst obtained in Comparative Example 1 is equivalent to or higher than that of the catalyst obtained in Example 2. However, the activity of the catalyst obtained in Comparative Example 1 sharply declines and becomes substantially completely lost in a short time. By contrast, the catalyst obtained in Example 2 exhibits stable long-term methane conversion activity even in the presence of sulfur dioxide.

EXAMPLE 13

Durability Evaluation Test 4

The catalyst obtained in Example 5 was formed into pellets, crushed and sieved to 1-2 mm grains. Using 0.75 ml of the resulting grains as a catalyst bed and maintaining the catalyst bed temperature at about 450° C., a gas consisting of 1000 ppm of methane, 10% of oxygen, 6% of carbon dioxide, 10% of steam, 2.7 ppm of sulfur dioxide and the residual part of helium was passed over the catalyst bed at a gas hourly space velocity (GHSV) of 40,000 $h^{-1}$ for 2 hours and then at a GHSV of 80,000 $h^{-1}$ to evaluate methane conversion % (catalyst durability). The gas compositions before and after passing over the catalyst reaction bed were measured with a gas chromatograph having a hydrogen flame ionization detector. Table 3 shows changes in methane conversion (%) with time.

TABLE 3

| Elapsed time (hr.) | Conversion of methane (%) |
|---|---|
| 1* | 99.3 |
| 2* | 99.5 |
| 3 | 97.1 |
| 4 | 96.6 |
| 6 | 95.3 |
| 8 | 94.8 |
| 10 | 93.2 |
| 20 | 90.5 |
| 30 | 90.8 |
| 37 | 89.4 |
| 50 | 90.6 |
| 60 | 89.4 |
| 70 | 88.1 |
| 80 | 89.1 |
| 93 | 87.7 |
| 100 | 88.7 |
| 120 | 87.6 |
| 141 | 87.2 |
| 165 | 87.7 |
| 180 | 86.8 |
| 200 | 89.5 |
| 240 | 87.9 |
| 285 | 87.5 |
| 320 | 87.8 |
| 335 | 87.5 |

*The values 1 or 2 hours later were obtained by passing gas at a gas hourly space velocity (GHSV) of 40,000 $h^{-1}$.

The results presented in Table 3 demonstrate that the catalyst obtained in Example 5 exhibits stable long-term catalytic activity even in the presence of sulfur dioxide which is known to greatly reduce catalyst activity.

EXAMPLE 14

Durability Evaluation Test 5

The catalyst obtained in Example 5 was formed into pellets, crushed and sieved to 1-2 mm grains. Using 0.75 ml of the resulting grains as a catalyst bed, durability of the catalyst was tested and evaluated under the same conditions as in Example 11 except that the catalyst bed temperature was maintained at 400° C. Table 4 shows changes in methane conversion (%) with time.

TABLE 4

| Elapsed time (hr.) | Conversion of methane (%) |
|---|---|
| 1* | 88.1 |
| 2* | 86.2 |
| 3 | 70.8 |
| 4 | 65.4 |
| 6 | 64.8 |
| 8 | 62.6 |
| 10 | 58.7 |
| 12 | 57.0 |
| 14 | 54.5 |
| 20 | 51.8 |
| 22 | 49.7 |
| 24 | 46.7 |
| 25 | 46.3 |
| 30 | 47.9 |
| 35 | 43.2 |
| 45 | 45.9 |

*The values 1 or 2 hours later were obtained by passing gas at a gas hourly space velocity (GHSV) of 40,000 $h^{-1}$.

The results presented in Table 4 clearly demonstrate that the catalyst of the present invention maintains high methane conversion % even at a comparatively low temperature of 400° C.

EXAMPLE 15

Preparation of 5% Pd/Tungsten-Zirconia

Added to 120 g of zirconium hydroxide (product of Mitsuwa Chemical Industries, Ltd.) were 15 g of tungstic acid ($H_2WO_4$, product of Mitsuwa Chemical Industries, Ltd.) and 140 g of water. The mixture was stirred at room temperature for 7 hours and dried at 120° C. for 2 hours, followed by calcining at 700° C. for 6 hours, giving tungsten-zirconia. The resulting product had a specific surface area of 76 $m^2/g$ by the BET method, and showed mainly tetragonal pattern by X-ray diffraction analysis.

A 10 g quantity of the tungsten-zirconia was immersed in 7 ml of palladium nitrate aqueous solution containing 0.5 g of palladium for 15 hours so that palladium was impregnated onto tungsten-zirconia, followed by drying and calcining at 550° C. for 9 hours, giving a 5% Pd/tungsten-zirconia.

EXAMPLE 16

Preparation of 5% Pd-1% Pt/Tungsten-Zirconia

A 10 g quantity of tungsten-zirconia prepared in the same manner as in Example 15 was immersed in 7 ml of a solution so as to impregnate palladium and platinum onto tungsten-zirconia, the solution being prepared by mixing a palladium nitrate aqueous solution containing 0.5 g of palladium with a tetraammineplatinum nitrate aqueous solution containing 0.1 g of platinum with stirring, followed by addition of pure water to make a total of 7 ml. The tungsten-zirconia was then dried, followed by calcining in air at 550° C. for 9 hours, giving a 5% Pd-1% Pt/tungsten-zirconia.

EXAMPLE 17

Preparation of 5% Pd/Sulfated Zirconia

A 80 g quantity of zirconium hydroxide was immersed in an aqueous solution of 8 g of ammonium sulfate in 70 g of water for 15 hours and dried at 110° C. for 3 hours, followed by calcining at 590° C. for 3 hours, giving sulfated zirconia.

The resulting product had a specific surface area of 126 m$^2$/g, and showed mainly tetragonal pattern by X-ray diffraction analysis.

A 10 g quantity of the sulfated zirconia was immersed in 8 ml of palladium nitrate aqueous solution containing 0.5 g of palladium for 15 hours so that palladium was impregnated onto sulfated zirconia. The sulfated zirconia was dried, followed by calcining at 500° C. for 6 hours, giving a 5% Pd/sulfated zirconia.

EXAMPLE 18

Catalyst Evaluation Test 6

The catalysts obtained in Examples 15 and 16 were formed into pellets, crushed and sieved to 1-2 mm grains. Using 0.75 ml each of the resulting grains as catalyst beds and maintaining the catalyst bed temperatures at about 450° C., a gas consisting of 1000 ppm of methane, 10% of oxygen, 6% of carbon dioxide, 10% of steam, 8 ppm of sulfur dioxide and the residual part of helium was passed over the catalyst beds at a GHSV (gas hourly space velocity) of 40,000 h$^{-1}$ for 2 hours and then at a GHSV of 80,000 h$^{-1}$ to evaluate methane conversion % (catalyst durability). The gas compositions before and after passing over the catalyst reaction beds were measured with a gas chromatograph having a hydrogen flame ionization detector. Table 5 shows changes in methane conversion (%) with time.

TABLE 5

| Elapsed time (hr.) | 5% Pd/ tungsten-zirconia | 5% Pd—1% Pt/ tungsten-zirconia |
|---|---|---|
| 1* | 69.3 | 93.9 |
| 2* | 65.4 | 92.2 |
| 3 | 40.2 | 72.4 |
| 4 | 39.9 | 68.0 |
| 6 | 46.5 | 66.5 |
| 8 | 43.3 | 63.7 |
| 10 | 47.3 | 62.0 |
| 12 | 46.2 | 67.0 |
| 14 | 51.8 | 68.9 |
| 16 | 48.7 | — |
| 18 | — | — |
| 20 | — | — |
| 22 | — | 65.6 |
| 24 | 44.7 | 67.6 |
| 25 | 45.0 | — |
| 26 | 46.6 | — |

*The values 1 or 2 hours later were obtained by passing gas at a gas hourly space velocity (GHSV) of 40,000 h$^{-1}$.
—: Not measured.

The results presented in Table 5 clearly demonstrate that the catalysts of the present inventions exhibit stable long-term catalytic activity (methane conversion %) even in the presence of sulfur dioxide which is generally known to greatly inhibit catalyst activity.

EXAMPLE 19

Catalyst Evaluation Test 7

Figure 2:
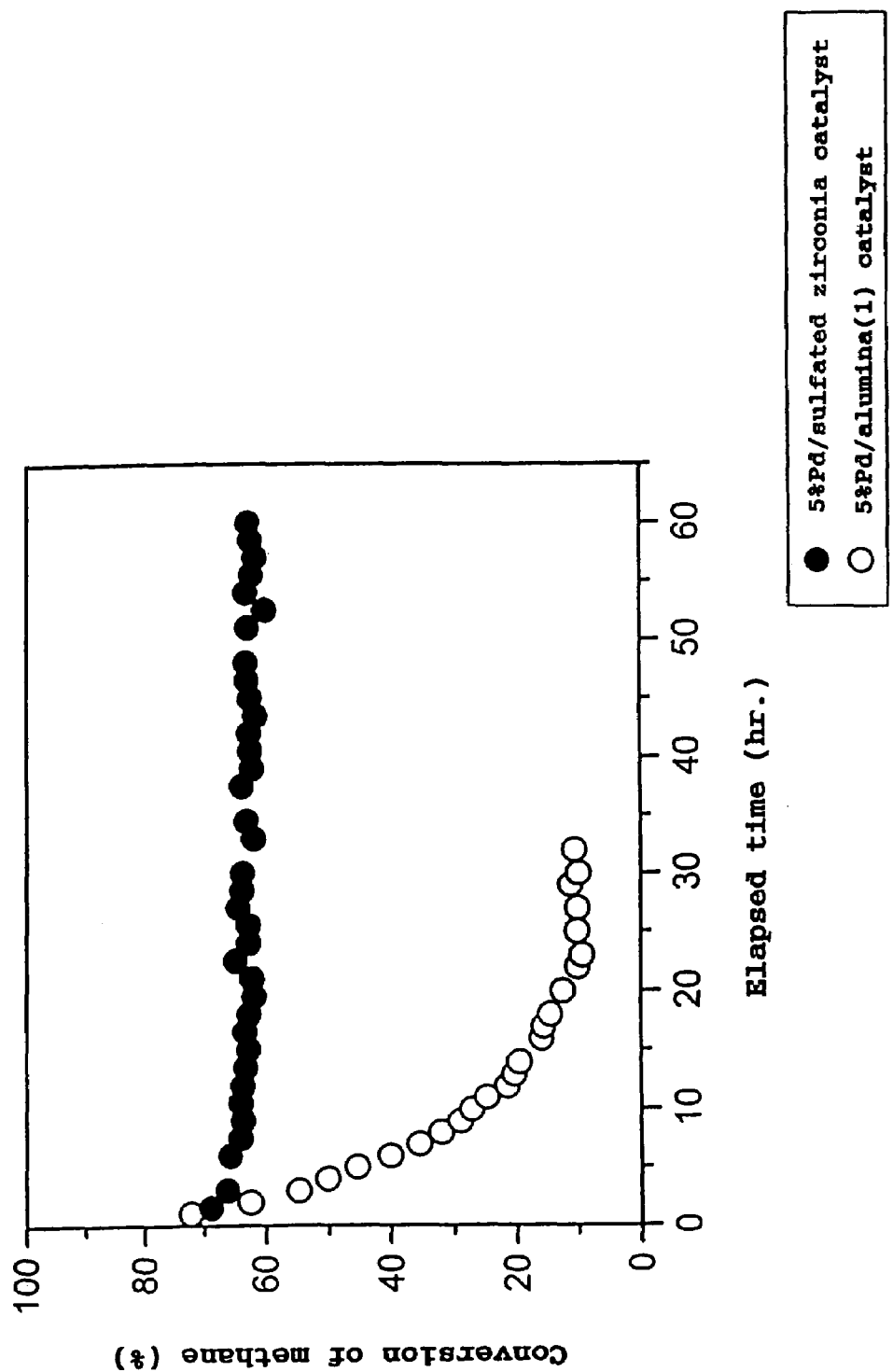
FIG. 2 is a graph showing time-dependent changes in conversion (%) of methane in exhaust gas, achieved by treating the exhaust gas with another catalyst of the present invention or with a control catalyst.

The catalysts obtained in Example 17 and Comparative Example 1 were formed into pellets, crushed and sieved to 1-2 mm grains. Using 1.5 ml each of the resulting grains as catalyst beds and maintaining the catalyst bed temperatures at about 450° C., a gas consisting of 1000 ppm of methane, 10% of oxygen, 6% of carbon dioxide, 9% of steam, 3 ppm of sulfur dioxide and the residual part of helium was passed over the catalyst beds at a gas hourly space velocity (GHSV) of 80,000 h$^{-1}$ to evaluate durability of the catalysts. The gas compositions before and after passing through the catalyst reaction beds were measured with a gas chromatograph having a hydrogen flame ionization detector. FIG. 2 shows changes in methane conversion (%) with time.

The results presented in FIG. 2 demonstrate that the catalyst of the present invention obtained in Example 17 exhibits stable catalytic activity even in the presence of sulfur dioxide which is known to greatly inhibit catalyst activity.

EXAMPLE 20

Catalyst Evaluation Test 8

Figure 3:
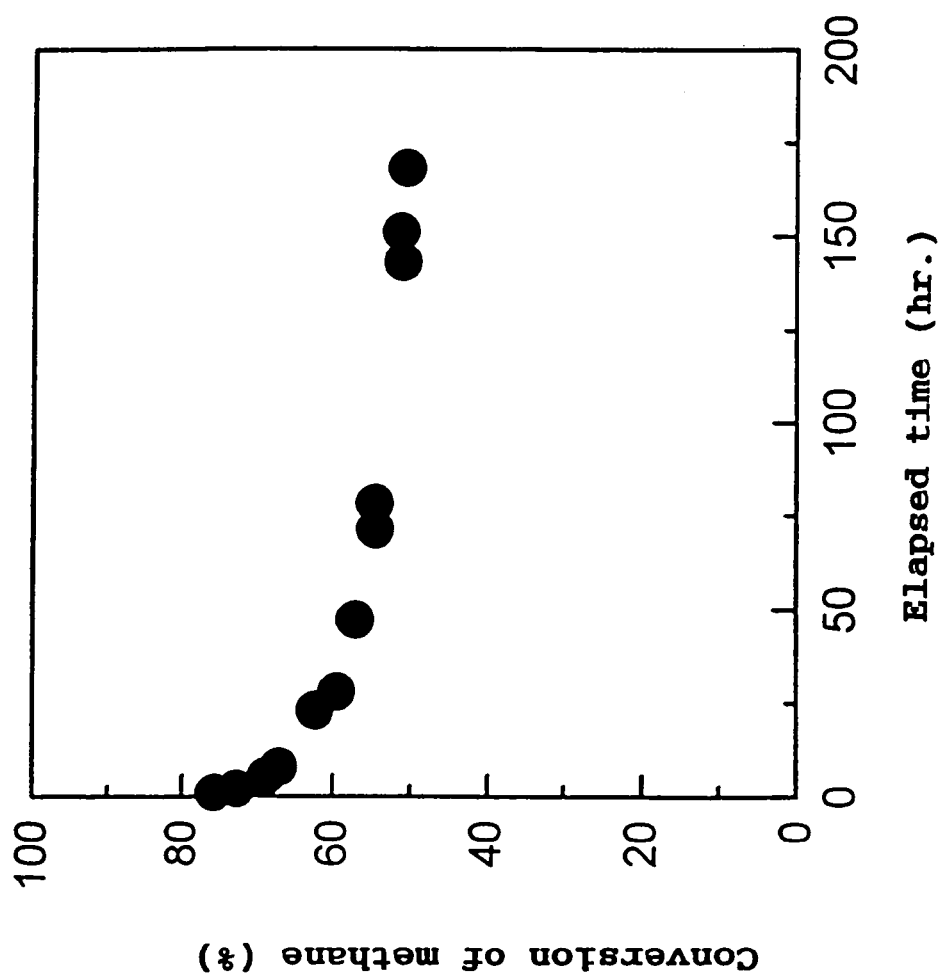
FIG. 3 is a graph showing time-dependent changes in conversion (%) of methane in exhaust gas, achieved by treating the exhaust gas with a further different catalyst of the present invention.

The catalyst obtained in Example 16 was formed into pellets, crushed and sieved to 1-2 mm grains. Using 1.5 ml of the resulting grains as a catalyst bed and maintaining the catalyst bed temperature at about 450° C., a gas consisting of 2000 ppm of methane, 1000 ppm of carbon monoxide, 10% of oxygen, 6% of carbon dioxide, 10% of steam, 0.3 ppm of sulfur dioxide and the residual part of nitrogen was passed over the catalyst bed at a gas hourly space velocity (GHSV) of 80,000 h$^{-1}$ to evaluate the catalyst. The gas compositions before and after passing over the catalyst reaction bed were measured with a gas chromatograph having a hydrogen flame ionization detector. FIG. 3 shows changes in methane conversion (%) with time.

The results presented in FIG. 3 demonstrate that the catalyst of the present invention obtained in Example 16 exhibits stable catalytic activity even in the presence of sulfur dioxide which is known to greatly reduce catalyst activity.

EXAMPLE 21

A cobalt ion-exchanged beta zeolite was prepared according to the method disclosed in WO96/29140. The resulting product had a SiO$_2$/Al$_2$O$_3$ ratio of 19 and a Co/Al ratio of 0.58.

A 6 ml quantity of the cobalt ion-exchanged beta zeolite was disposed on the upstream side in a reaction tube, and 1 ml of a 5% Pd-1% Pt/zirconia catalyst was disposed on the downstream side. While the temperature of the reaction tube was maintained at about 450° C., a gas consisting of 100 ppm of nitrogen monoxide, 1600 ppm of methane, 110 ppm of ethane, 70 ppm of propane, 35 ppm of n-butane, 10% of oxygen, 9% of steam, 0.3 ppm of sulfur dioxide and the residual part of nitrogen was passed over the catalyst bed at a flow rate of 1 liter per minute (calculated at 0° C.). The nitrogen oxide (NOx) conversion and residual methane concentration were measured after the start of the reaction. Table 6 shows the results.

TABLE 6

| Elapsed time (hr.) | Conversion of NOx (%) | Residual methane concentration (ppm) |
|---|---|---|
| 50 | 55 | 95 |
| 100 | 52 | 120 |
| 200 | 52 | 126 |

EXAMPLE 22

A 6 ml quantity of the cobalt ion-exchanged beta zeolite as prepared in Example 21 was disposed on the upstream side in a reaction tube, and 1 ml of a 5% Pd/zirconia catalyst was disposed on the downstream side. While the temperature of the reaction tube was maintained at about 450° C., a gas consisting of 100 ppm of nitrogen monoxide, 1600 ppm of methane, 110 ppm of ethane, 70 ppm of propane, 35 ppm of n-butane, 10% of oxygen, 9% of steam, 0.3 ppm of sulfur dioxide and the residual part of nitrogen was passed over the catalyst bed at a flow rate of 1 liter per minute (calculated at 0° C.). The nitrogen oxide (NOx) conversion (%) and residual methane concentration were measured after the start of the reaction. Table 7 shows the results.

TABLE 7

| Elapsed time (hr.) | Conversion of NOx (%) | Concentration of residual methane (ppm) |
|---|---|---|
| 50 | 55 | 580 |
| 100 | 52 | 650 |
| 200 | 52 | 660 |

COMPARATIVE EXAMPLE 6

A 6 ml quantity of the cobalt ion-exchanged beta zeolite as prepared in Example 21 was disposed on the upstream in a reaction tube, and 1 ml of a 5% Pd/alumina catalyst (1) was disposed on the downstream side. While the temperature of the reaction tube was maintained at about 450° C., gas consisting of 100 ppm of nitrogen monoxide, 1600 ppm of methane, 110 ppm of ethane, 70 ppm of propane, 35 ppm of n-butane, 10% of oxygen, 9% of steam, 0.3 ppm of sulfur dioxide and the residual part of nitrogen was passed over the catalyst beds at a flow rate of 1 liter per minute (calculated at 0° C.). The nitrogen oxide (NOx) conversion (%) and residual methane concentration were measured after the start of the reaction. Table 8 shows the results.

TABLE 8

| Elapsed time (hr.) | Conversion of NOx (%) | Concentration of residual methane (ppm) |
|---|---|---|
| 50 | 55 | 1100 |
| 100 | 52 | 1330 |
| 200 | 52 | 1380 |

The results presented in Tables 6 to 8 clearly demonstrate that the method of the present invention greatly reduces the level of nitrogen oxides in exhaust gas using natural gas as a reducing agent, while avoiding the problem that a large amount of unreacted methane resides.

The invention claimed is:

1. A catalyst for removing methane from exhaust gas containing methane, sulfur dioxide, and an excess of oxygen, which comprises palladium directly supported on a carrier consisting essentially of zirconia having a specific surface area of 5 to 50 $m^2/g$.

2. The catalyst according to claim 1 wherein the weight proportion of the supported palladium is 2% to 20% relative to the carrier.

3. A catalyst for removing methane from exhaust gas containing methane, sulfur dioxide, and an excess of oxygen, which comprises palladium and platinum both directly supported on a carrier consisting essentially of zirconia having a specific surface area of 5 to 50 $m^2/g$.

4. The catalyst according to claim 3 wherein the weight proportion of the supported palladium is 2% to 20% relative to the carrier, and the weight proportion of the supported platinum is 10% to 50% relative to the palladium.

* * * * *